United States Patent [19]

Bertrand et al.

[11] Patent Number: 5,605,712
[45] Date of Patent: Feb. 25, 1997

[54] STABILIZER COMPOSITIONS, FROZEN DESSERTS CONTAINING THE SAME AND STABILIZING METHOD

[75] Inventors: Dale T. Bertrand, East Windsor, N.J.; Daniel T. Hogan, Yardley; Domingo C. Tuason, Bensalem, both of Pa.

[73] Assignee: FMC Corporation, Philadelphia, Pa.

[21] Appl. No.: 536,821

[22] Filed: Sep. 29, 1995

[51] Int. Cl.$^6$ .................................................. A23G 9/00
[52] U.S. Cl. ..................... 426/565; 426/566; 426/567; 426/573; 426/613; 426/654; 426/804
[58] Field of Search .................................. 426/573, 575, 426/565–7, 654, 804, 613, 583

[56] References Cited

U.S. PATENT DOCUMENTS

| | | | |
|---|---|---|---|
| 4,400,405 | 8/1983 | Morley et al. | 426/565 |
| 4,400,406 | 8/1983 | Morley et al. | 426/565 |
| 4,421,778 | 12/1983 | Kahn et al. | 426/564 |
| 4,744,987 | 5/1988 | Mehra et al. | 424/156 |
| 5,192,569 | 3/1993 | McGinley et al. | 426/96 |
| 5,338,562 | 8/1994 | Humphreys | 426/603 |
| 5,366,742 | 11/1994 | Tuason, Jr. et al. | 426/96 |

*Primary Examiner*—Jeanette Hunter
*Attorney, Agent, or Firm*—Polly E. Ramstad; Robert L. Andersen

[57] ABSTRACT

A stabilizer composition useful for frozen desserts contains a water soluble hydrocolloid and microcrystalline cellulose coprocessed with an alginate salt complex. The method of using the stabilizer composition provides good resistance to heat shock in frozen desserts. The frozen desserts containing the stabilizer system, including such products with less than five percent fat, exhibit resistance to heat shock and good textural characteristics.

37 Claims, No Drawings

STABILIZER COMPOSITIONS, FROZEN DESSERTS CONTAINING THE SAME AND STABILIZING METHOD

BACKGROUND OF THE INVENTION

1. Field of the Invention

The invention relates to frozen deserts containing, as a stabilizer composition, a water soluble hydrocolloid and microcrystalline cellulose coprocessed with an alginate salt complex. The invention also extends to the stabilizer composition and the method of formulating frozen desserts with the stabilizer.

2. Background Information

In the food industry, the term "frozen desserts" is a market category that encompasses a wide variety of popular and specialty products whose common denominator is that they are served at temperatures below the freezing point of water. Frozen desserts include dairy-based food desserts such as ice cream, ice milk, sherbet, gelato, frozen yogurt, soft serve ice cream; nondairy-based desserts such as mellorine; and specialty items such as frozen novelties, e.g., bars, cones and sandwiches. Frozen desserts also include reduced fat (also called low-fat or light) and no fat (also called fat-free) versions of many of these frozen desserts. In recent years, reduced fat and no fat frozen desserts have become a significant, growing segment of the frozen desserts market.

Frozen dessert formulations typically are multiphase compositions: solid, liquid and air, with the liquid sometimes including oil and water phases. This characteristic of frozen desserts, which is the basis for their food appeal to consumers, presents the manufacturer or formulator with difficulties in maintaining the desired product qualities until the frozen dessert product is ultimately consumed.

Negative sensory characteristics in frozen desserts usually result from perceived body or textural defects, and these may arise for a variety of reasons: formulation or ingredients used, manufacturing process employed or storage conditions used. A particularly common textural defect in frozen desserts results from the formation of large ice crystals, a problem often aggravated by fluctuations in storage temperature conditions.

Stabilization techniques are described in the prior art for reducing the potential for adverse body or textural defects in frozen desserts. Many frozen dessert stabilizers function to bind water, which reduces the likelihood of ice crystal growth during storage, and such stabilizer compositions often include hydrocolloid gums.

U.S. Pat. Nos. 4,400,405 and 4,400,406 both issued to Morley et al. describe whipped frozen desserts, including low fat versions, that utilize a stabilizer including a water binding agent (e.g., locust bean gum, guar gum, propylene glycol alginate, tara gum, cellulose ethers), a gelling agent (e.g., gelatin, xanthan gum, carrageenan, sodium alginate, pectin), and an insoluble blocking agent (e.g., microcrystalline cellulose, cellulose fibers) (see cols. 7–8).

U.S. Pat. No. 4,421,778 issued to Kahn et al. describes freezer stable whipped ice cream and milk shake products that contain as stabilizers microcrystalline cellulose and carboxymethylcellulose, optionally with a third stabilizer, calcium carrageenan or sodium alginate (col. 1, lines 35–53.).

U.S. Pat. No. 5,366,742 issued to Tuason, Jr. et al. describes a dry microcrystalline cellulose composition (MCC) that is MCC coprocessed with an alginate calcium/sodium salt complex. A frozen dessert containing 4% butterfat and this composition in a 80:20 MCC to alginate ratio is described at cols. 10–11 as providing functionality that was equivalent to colloidal microcrystalline cellulose, i.e., MCC coprocessed with sodium carboxymethylcellulose.

An object of the present invention is a stabilizer composition and method useful for providing heat shock resistance in frozen desserts.

SUMMARY OF THE INVENTION

One aspect of the present invention is a stabilizer composition, useful for stabilizing frozen desserts, having (a) a first component of microcrystalline cellulose (MCC) coprocessed with a calcium/sodium alginate salt complex and containing sufficient MCC such that the weight ratio of MCC to alginate salt complex is greater than about 80:20, in combination with (b) a second component of at least one water soluble hydrocolloid selected from the group consisting of guar gum, locust bean gum, sodium alginate, carrageenan, gum tragacanth, karaya gum, gum arabic, agar, konjac, xanthan gum, carboxymethylcellulose, methylcellulose, hydroxymethylcellulose and hydroxypropylmethylcellulose.

The stabilizer composition preferably contains, in the first component, sufficient microcrystalline cellulose such that the weight ratio of MCC to calcium/sodium alginate salt complex is greater than about 80:20 up to about 90:10 MCC to alginate salt complex. When the stabilizer composition contains carboxymethylcellulose, the first component of the stabilizer composition preferably contains a ratio of MCC to alginate salt complex of about 85:15.

Preferred stabilizer compositions are those in which the second component is at least one water soluble hydrocolloid selected from the group consisting of guar gum, locust bean gum, sodium alginate, carrageenan, xanthan gum and carboxymethylcellulose. Still another preferred stabilizer composition is one that is essentially free of carboxymethylcellulose.

Another aspect of this invention is a frozen dessert product having less than about 12 weight % fat and containing a stabilizer system that has (a) a first component of microcrystalline cellulose (MCC) coprocessed with a calcium/sodium alginate salt complex, containing sufficient MCC such that the weight ratio of MCC to alginate salt complex is greater than about 80:20, in combination with (b) a second component of at least one water soluble hydrocolloid selected from the group consisting of guar gum, locust bean gum, sodium alginate, carrageenan, gum tragacanth, karaya gum, gum arabic, agar, konjac, xanthan gum, carboxymethylcellulose, methylcellulose, hydroxymethylcellulose and hydroxypropylmethylcellulose.

The stabilizer system is preferably present in the frozen dessert in an amount of from about 0.1 weight % to about 1 weight %. The first component of the stabilizer system is preferably present in the frozen dessert in an amount of from about 0.05 weight % to about 0.8 weight %. The second component is preferably present in the frozen dessert in an amount of from about 0.05 weight % to about 0.8 weight %.

Preferred frozen dessert products are those utilizing the stabilizer composition of this invention and containing less than about 5 weight % fat, including no fat frozen dessert products. Such frozen dessert products include ice cream, ice milk, soft serve ice cream, frozen yogurt, frozen milk shake, sherbet, gelato and mellorine.

Still another aspect of this invention is a method of providing heat shock resistance in a frozen dessert product by incorporating into the frozen dessert a stabilizer system that has (a) a first component of microcrystalline cellulose (MCC) coprocessed with a calcium/sodium alginate salt complex, containing sufficient MCC such that the weight ratio of MCC to alginate salt complex is greater than about 80:20, in combination with (b) a second component of at least one water soluble hydrocolloid selected from the group consisting of guar gum, locust bean gum, sodium alginate, carrageenan, gum tragacanth, karaya gum, gum arabic, agar, konjac, xanthan gum, carboxymethylcellulose, methylcellulose, hydroxymethylcellulose and hydroxypropylmethylcellulose; the stabilizer system being incorporated into the frozen dessert in an amount of from about 0.1 weight % to about 1 weight %; and the frozen dessert having less than about 12 weight % fat.

The method is particularly effective where the frozen dessert contains less than about 5 weight % fat or contains essentially no fat.

DETAILED DESCRIPTION OF THE PREFERRED EMBODIMENTS

The stabilizer composition and the frozen dessert products containing the stabilizer system of this invention provide desirable performance characteristics, e.g., resistance to heat shock and good textural properties, even where the frozen dessert product contains less than about 5 weight % fat or contains essentially no fat.

The first component of the stabilizer of this invention is microcrystalline cellulose that has been coprocessed with an alginate salt complex which contains both calcium and sodium alginate (hereinafter also referred to as calcium/sodium alginate salt complex or alginate salt complex). The coprocessed microcrystalline cellulose is a particulate material that is at least partially coated with the calcium/sodium alginate salt complex. The term "coprocessed" as used in this specification refers to the physical processing of the named hydrocolloid with MCC in a manner that imparts improved physical properties or characteristics to the coprocessed MCC, not exhibited by MCC alone or by simple blends or mixtures of MCC with the hydrocolloid. Such coprocessing may be accomplished, for example, by the high shear mixing of the two components dispersed in an aqueous medium, followed by drying of the recovered coprocessed MCC. The resulting coprocessed MCC material is readily dispersible in an aqueous medium.

The alginate salt complex utilized in this invention contains both calcium alginate and sodium alginate, where the weight ratio of calcium to sodium in the alginate salt complex is in the range of about 0.4:1 to about 2.3:1, more preferably about 1.3:1 to about 1.7:1, and most preferably about 1.5:1. The alginate salt complex may be prepared by utilizing sodium alginate, which is a water-soluble algin salt. The sodium alginate is introduced into an aqueous medium along with a calcium salt such as calcium chloride, calcium lactate or monocalcium phosphate (anhydrous or monohydrate), in an amount sufficient to displace a portion of the sodium of the sodium alginate. This process is desirably carried out with MCC being present in the aqueous medium to result in the formation of a barrier dispersant effective amount of a water insoluble calcium and sodium alginate complex in situ, adsorbed on or otherwise coating or occluding the MCC particles. After being subjected to high shear, the combined MCC and alginate salt complex is dried to yield the coprocessed MCC and alginate salt complex.

A coprocessed MCC and alginate salt complex that is suitable for use in this invention is commercially available from FMC Corporation (Philadelphia, Pa.) under the trademark Avicel® AC, e.g., Avicel® AC 815 microcrystalline cellulose.

The coprocessed MCC and alginate salt complex employed in this invention is described in U.S. Pat. No. 5,366,742 issued to Tuason and McGinley on Nov. 22, 1994. Since U.S. Pat. No. 5,366,742 discloses detailed information about the characteristics and method of manufacture of the coprocessed MCC and alginate salt complex, this U.S. patent is hereby incorporated by reference into the present specification.

The alginate salt complex is present with the microcrystalline cellulose in the coprocessed material in a weight ratio of about 90:10 to about 80:20 MCC to alginate salt complex, according to the disclosures of U.S. Pat. No. 5,366,742. The inventors have discovered that as the relative amount of alginate salt is increased and the weight ratio of MCC to alginate salt complex approaches about 80:20, the increased proportion of alginate salt complex in the coprocessed material generally results in increased viscosity of the aqueous frozen dessert, for a given amount of stabilizer. Such increased viscosity may lead to processing difficulties during the manufacture of the frozen dessert formulation into a finished product.

Preferred stabilizer compositions for the present invention are those in which the first component, the coprocessed MCC and alginate salt complex, has sufficient MCC such that the weight ratio is greater than about 80:20 MCC to alginate salt complex, i.e., the weight ratio is 81:19 or more MCC to alginate salt complex. More preferably, the coprocessed material contains sufficient MCC such that the weight ratio is greater than about 80:20 up to about 90:10 MCC to alginate salt complex, with about 85:15 MCC to alginate salt complex being most preferred.

The selection and amount of the water soluble hydrocolloid component in this invention are also factors that affect the viscosity provided by the stabilizer. One skilled in the art will appreciate in view of this disclosure, that the viscosity of the frozen dessert formulation during its manufacture may be adjusted through manipulation of all of these parameters in the stabilizer system, to obtain viscosity values within acceptable ranges.

The second component of the stabilizer of this invention is a water soluble hydrocolloid. The hydrocolloid utilized in combination with the coprocessed MCC and alginate salt complex may be selected from any of one or more water soluble hydrocolloids, e.g., guar gum, locust bean gum, sodium alginate, carrageenan, gum tragacanth, karaya gum, gum arabic, agar, konjac, xanthan gum, carboxymethylcellulose, methylcellulose, hydroxymethylcellulose and hydroxypropylmethylcellulose. The term "water soluble" as used herein with reference to hydrocolloids extends to hydrocolloid materials which are hydrophilic and which are water-binding, water gelling and/or water soluble. Since many of these hydrocolloids provide excellent gelling or water binding characteristics at relatively low concentrations, the term "water soluble" includes hydrocolloids which may be solubilized in water in small amounts. Suitable hydrocolloids include hydrocolloid gums naturally derived from plants, including seaweeds, such as guar gum, locust bean gum, sodium alginate, carrageenan, potassium alginate, gum tragacanth, karaya gum, gum arabic, agar, and konjac. Other hydrocolloids such as xanthan gum, carboxymethylcellulose and other functionally-equivalent cellulose ethers like hydroxymethylcellulose, methylcellulose, and hydroxypropylmethylcellulose may also be used.

Many of these hydrocolloid gums may be employed in mixtures with each other, to provide complementary properties or characteristics not obtained from the individual gums alone. Especially useful as the hydrocolloid component of the stabilizer are guar gum, locust bean gum, sodium alginate, carrageenan, xanthan and carboxymethylcellulose, used either individually or in mixtures of two or more of these hydrocolloids.

The hydrocolloid component is typically in the form of a dried powder, which facilitates its combination with the coprocessed MCC and alginate salt complex which is also normally a powdered material. These two components of the stabilizer may be combined by conventional methods, e.g., dry blending, with or without other adjuvant materials being present as well. Particularly useful in frozen dessert manufacture are stabilizer blends that contain not only the two components, but also adjuvants (i) that are other components ordinarily included in specific frozen dessert formulations, such as emulsifiers (e.g., mono- and diglycerides of fatty acids (including distilled monoglycerides of fatty acids), polyoxyethylene sorbitan esters like polysorbate 80 or 65, lecithin), standardization agents (e.g., dextrose or the like for adjusting the viscosity or other properties of the stabilizer composition) or (ii) that improve the performance of the stabilizer in specific frozen dessert formulations, such as sequestrants to aid in dispersion of the stabilizer and other dry ingredients into the frozen dessert formulation, e.g., calcium ion sequestrants. It will be evident to one skilled in the art in view of the disclosures herein that other materials, such as sweeteners (e.g., sugar, corn syrup solids), coloring agents, flavorings and the like, could also be incorporated into the stabilizer composition, particularly for stabilizers formulated for a specific frozen dessert.

One preferred embodiment of this invention is a stabilizer composition, useful for stabilizing frozen dessert formulations, that has a first component of microcrystalline cellulose coprocessed with a calcium/sodium alginate salt complex and containing sufficient MCC such that the weight ratio of MCC to alginate salt complex is greater than about 80:20, in combination with a second component of at least one water soluble hydrocolloid, where the hydrocolloid is not carboxymethylcellulose or other similar cellulose ethers, such as methylcellulose, hydroxymethylcellulose, hydroxypropylmethylcellulose and the like. Such stabilizer compositions and frozen dessert products containing the stabilizer system provide desirable performance characteristics, without resorting to the presence of carboxymethylcellulose or other similar cellulose ethers as a stabilizer. The absence of cellulose ethers such as carboxymethylcellulose, methylcellulose, hydroxymethylcellulose, hydroxypropylmethylcellulose and the like provides the stabilizer composition and frozen dessert products of the invention with a desirable attribute. They are deemed to be all natural food products under governmental regulatory guidelines covering such food-grade compositions and food products in many jurisdictions.

Carboxymethylcellulose is commonly used in frozen dessert products and stabilizer compositions for such products because of superior performance attributes provided by its presence, e.g., clean flavor, good body and chewiness, and good solubility in cold aqueous media. The stabilizer composition and frozen dessert products of this preferred embodiment, being essentially free of any carboxymethylcellulose or any other equivalent cellulose ethers with similar functional properties, nevertheless provide equivalent or superior performance characteristics, a surprising result not suggested by the teachings in the prior art.

The stabilizer of the invention generally contains the two components in relative amounts such that the first component, i.e., coprocessed MCC and alginate salt complex, is present in an equal or greater amount by weight, relative to the second component, i.e., the water soluble hydrocolloid component. The weight ratio of the first component to the second component in the stabilizer is preferably from about 1:1 (50:50) to about 19:1 (95:5), and more preferably, from about 1.5:1 to about 8:1.

The amount of stabilizer incorporated into a typical frozen dessert formulation is generally in the range of about 0.1 weight % to about 1 weight %, based on the weight of the frozen dessert. Preferably, the amount of stabilizer is about 0.2 weight % to about 0.6 weight %. These preferred amounts of stabilizer normally provide not only good resistance to heat shock in a frozen dessert product but also satisfactory sensory characteristics, i.e., good textural properties like clean flavor, smooth texture, creamy mouthfeel, controlled meltdown and the absence of coldness, large ice crystal formation and gumminess.

In a frozen dessert, the first component, the coprocessed MCC and alginate salt complex, of the stabilizer system is preferably present in an amount of from about 0.05 weight % to about 0.8 weight %, and more preferably, from about 0.1 weight % to about 0.6 weight %, based on the total weight of the frozen dessert.

The second component, the water soluble hydrocolloid, in the stabilizer system is preferably present in an amount of from about 0.05 weight % to about 0.8 weight %, and more preferably, from about 0.1 weight % to about 0.5 weight %, based on the total weight of the frozen dessert. The amount of the second component in the stabilizer system, relative to the first component, is preferably within the ratio ranges noted above.

The frozen dessert products of this invention are those utilizing the stabilizer composition of this invention and containing less than about 12 weight % fat, preferably containing less than about 5 weight % fat, including no fat frozen dessert products that contain essentially no fat. Such frozen dessert products include ice cream, ice milk, soft serve frozen desserts like soft serve ice cream, frozen yogurt, frozen milk shake, sherbet, gelato and mellorine. Such frozen dessert products may contain a fat source that is butterfat, milkfat, vegetable fat, vegetable oil, or other functionally equivalent fat or lipid.

One general procedure for formulating a frozen dessert includes the steps:

1. Blend dry ingredients, which include the stabilizer composition and may include sweeteners (e.g., sugar, corn syrup solids), protein constituents (e.g., milk solids non fat) and emulsifiers.
2. Melt fat constituent with emulsifier, if emulsifier not added in step (1).
3. Add dry blend from step (1) to water and/or aqueous constituents (e.g., milk), and mix for sufficient time to ensure hydration of stabilizer components.
4. Added melted fat constituent from step (2) to aqueous mixture from step (3), with turbulent mixing.
5. Pasteurize the mixture from the previous step via HTST, homogenize and refrigerate for sufficient time to age, e.g., overnight.
6. Blend in flavorings, if not added in a prior step.
7. Freeze mixture in continuous ice cream freezer at desired overrun ("overrun" is a measure of the amount of air deliberately introduced into the mixture; 100% overrun means that the frozen product contains 50% air by volume).

Another general procedure, useful for formulating frozen desserts that do not utilize a solid fat source, includes the steps:

1. Blend dry ingredients, including the stabilizer composition.
2. Mix aqueous constituents, including the fat source (e.g., milk, cream) and then add the dry blend from step (1) with continued mixing to ensure complete hydration of the stabilizer components.

The remaining steps (3)–(5) are the same as steps (5)–(7) noted in the previous procedure.

Other procedures known to those skilled in the art of frozen dessert formulation and manufacture may also be used. The point or step at which the stabilizer composition should be added will be evident to one skilled in the art, based on the disclosures in this specification.

The invention is illustrated further by the following nonlimiting Examples.

EXAMPLES

Example 1

Example 1 describes two frozen dessert formulations containing 4 weight % fat and the stabilizer compositions of this invention, at a use level of 0.51 weight % based on the weight of the frozen dessert. One formulation, Example 1A, contained a stabilizer composition with a first component of coprocessed microcrystalline cellulose having a weight ratio of 85:15 MCC to calcium/sodium alginate salt complex and a second component of carboxymethylcellulose and carrageenan. The second formulation, Example 1B, contained a stabilizer composition that was similar to that of Example 1A except that the weight ratio of the first component was 90:10 MCC to calcium/sodium alginate salt complex. The alginate salt complex in both coprocessed MCC materials contained calcium and sodium in a respective weight ratio of 1.5:1.

Two other stabilized frozen dessert formulations were also included to provide a basis for comparison. Comparative Example C-1A utilized a multicomponent stabilizer that contained a coprocessed microcrystalline cellulose with 80:20 MCC to calcium/sodium alginate salt complex (weight ratio) and also contained carboxymethylcellulose and carrageenan. Comparative Example C-1B utilized a multicomponent stabilizer that contained a coprocessed microcrystalline cellulose, Avicel® RC-581 (FMC Corporation, Philadelphia, Pa.), a colloidal microcrystalline cellulose coprocessed with 80:20 MCC to sodium carboxymethylcellulose (weight ratio), and also contained carboxymethylcellulose and carrageenan.

The frozen dessert formulations were prepared by the following procedure, which is specific to Example 1A. For Examples 1B, C-1A and C-1B, the procedure was identical except that the coprocessed materials noted above were substituted for the 85:15 MCC to calcium/sodium alginate salt complex of Example 1A.

In a container stirred with a Lightnin® mixer (Lightnin, Rochester, N.Y.) were placed the following liquid components: 2965.6 grams (g) whole milk, 1200.8 g light cream, and 1779.2 g skim milk. This mixture was mixed for about 5 minutes before 500 g corn syrup was added with continued mixing.

A dry blend was prepared containing 533.6 g milk solids non fat, 960 g sugar, 20 g Tandem® 100K emulsifier, which is an 80:20 mixture of mono-, diglycerides to polysorbate 80 (Witco Corporation, Greenwich, Conn.), and the stabilizer composition: 32 g 85 weight % microcrystalline cellulose coprocessed with 15 weight % alginate salt complex, 8 g Aqualon® 7HF carboxymethylcellulose (Hercules Incorporated, Wilmington, Del.) and 0.8 g SeaKem® IC 614 carrageenan (FMC Corporation, Philadelphia, Pa.). This dry blend was then added to the vortex of the liquid components in the stirred container and was mixed for 30 minutes to fully hydrate the hydrocolloid gums in the dry blend.

The mixture was then pasteurized by a high temperature short time process (HTST) utilizing a Cherry-Burrel Ultra High Temperature unit operated for two minutes at 76.7° C. (170° F.). After pasteurization, the mixture was homogenized using an APV Gaulin Homogenizer, the first stage being operated at 2000 psi and the second stage at 500 psi. Upon completion of homogenization, the homogenized mixture was cooled and aged overnight in a refrigerator at 1.7°–4.4° C. (35°–40° F.).

After the overnight aging, 37.9 g vanilla flavor was added to the homogenized mixture, with gentle stirring with a wooden spoon to prevent incorporation of air into the mixture. The mixture was then processed by freezing in an Armfield FT-25A continuous freezer.

Prior to being frozen, the viscosity of the homogenized flavored mixture was first determined for a 400 mL (milliliter) sample using a Brookfield RVT viscometer with spindle #3 at 20 rpm. A second viscosity measurement was made using a #3 Zahn cup. After freezing was complete, a frozen sample of the frozen dessert was characterized by calculating the overrun and measuring stiffness using a Brookfield RVT viscometer equipped with t-bar F and operated at 10 rpm for 15 seconds without a heliopath.

The results of this procedure with Example 1A are summarized in Table 1 below, along with the results obtained for similar procedures carried out with the frozen desserts in Example 1B and Comparative Examples C-1A and C-1B.

The preferred stabilizer composition employed in the frozen dessert formulation of Example 1A yielded the best results. A drawback of the stabilizer in the frozen dessert formulation of Comparative Example C-1A was the significantly higher viscosity values encountered with the mixture prior to freezing; use of this stabilizer could lead to unacceptable processing viscosities for some frozen dessert formulations.

TABLE 1

| Example | Viscosity (cps)[a] | Viscosity (seconds)[b] | Temperature[c] (°C. (°F.)) | Overrun[d] (%) | Stiffness (cps × 10⁶) | Comments |
|---|---|---|---|---|---|---|
| 1A: 85:15[e] | 300 | 14 | 2.8 (37) | 87 | 22.0 | Extruded dry |
| 1B: 90:10 | 100 | 11 | 2.8 (37) | 115 | 15.5 | Very wet upon extrusion |

TABLE 1-continued

| Example | Viscosity (cps)[a] | Viscosity (seconds)[b] | Temperature[c] (°C. (°F.)) | Overrun[d] (%) | Stiffness (cps × 10⁶) | Comments |
|---|---|---|---|---|---|---|
| C-1: 80:20 | 500 | 25.5 | 2.8 (37) | 96 | 21.0 | Extruded dry |
| C-2: Avicel ® RC-581[f] | 200 | 12.5 | 1.1 (34) | 90 | 15.0 | Wet upon extrusion |

[a]Brookfield RVT viscometer, spindle #3.
[b]#3 Zahn cup.
[c]Temperature at which viscosity measurements were made.
[d]Overrun is a measure of the amount of air deliberately introduced into the frozen dessert during freezing.
[e](85:15) is the ratio of microcrystalline cellulose (85 parts) to alginate salt complex (15 parts) present in the coprocessed material.
[f]Avicel ® RC-581 contains coprocessed MCC and CMC in a ratio of 80:20

Example 2

Example 2 describes three frozen dessert formulations containing 4 weight % fat and the stabilizer compositions of this invention, the latter at three use levels, 0.41 weight 0.51 weight % and 0.71 weight %, all based on the weight of the formulations. In Examples 2A, 2C and 2E, the stabilizer composition used at the three use levels contained a first component that was coprocessed microcrystalline cellulose with a weight ratio of 85:15 MCC to calcium/sodium alginate salt complex. In Examples 2B, 2D and 2F, the stabilizer composition used at the three use levels contained a first component that was coprocessed microcrystalline cellulose with a weight ratio of 90:10 MCC to calcium/sodium alginate salt complex. The alginate salt complex in both coprocessed MCC materials contained calcium and sodium in a respective weight ratio of 1.5:1. The second component in all of the stabilizer compositions was carboxymethylcellulose and carrageenan.

For comparative purposes, similar frozen dessert formulations were prepared with another multicomponent stabilizer, at identical use levels. The multicomponent stabilizer in the Comparative Examples, designated C-2A, C-2B and C-2C, contained a coprocessed microcrystalline cellulose, Avicel® RC-581 (FMC Corporation, Philadelphia, Pa.), a colloidal microcrystalline cellulose coprocessed with 80:20 MCC to sodium carboxymethylcellulose (weight ratio), and also contained carboxymethylcellulose and carrageenan.

The formulation data for the frozen dessert of Example 2A are summarized in Table 2 below, and Table 2 also includes the formulation data for all of the other frozen desserts prepared in this Example 2. Note that the flavor component, which is introduced after the frozen dessert formulation is homogenized, is not included in the formulation data shown in Table 2.

The frozen desserts were prepared by the following procedure, which is specific to Example 2A. For the other Examples, the procedure was similar except that the coprocessed materials noted above were substituted (in Examples 2B, 2D, 2F, C-2A, C-2B and C-2C) for the 85:15 MCC to calcium/sodium alginate salt complex of Example 2A and the use levels of the stabilizer were increased in Examples 2C, 2D, 2E, 2F, C-2B and C-2C.

In a container stirred with a Lightnin® mixer were placed the following liquid components: 2965.6 g whole milk, 1200.8 g light cream, 1779.2 g skim milk, and 104 g water. These ingredients were mixed for about 5 minutes.

A dry blend was prepared containing 533.6 g milk solids non fat, 960 g sugar, 417.6 g corn syrup solids, 20 g Tandem® 100K emulsifier, an 80:20 mixture of mono-, diglycerides to polysorbate 80 (Witco Corporation, Greenwich, Conn.), and the stabilizer composition: 24 g 85% microcrystalline cellulose coprocessed with 15% alginate, 8.0 g Aqualon® 7HF carboxymethylcellulose (Hercules Incorporated, Wilmington, Del.), 0.8 g SeaKem® IC 614 carrageenan (FMC Corporation, Philadelphia, Pa.). This dry blend was then added to the vortex of the liquid components in the stirred container and was mixed for 30 minutes to fully hydrate the hydrocolloid gums in the dry blend.

The mixture was then pasteurized by HTST in a Cherry-Burrel Ultra High Temperature unit operated for two minutes at 76.7° C. (170° F.). After pasteurization, the mixture was homogenized using an APV Gaulin Homogenizer, the first stage being operated at 2000 psi and the second stage at 500 psi. Upon completion of homogenization, the homogenized mixture was cooled and aged overnight in a refrigerator at 1.7°–4.4° C. (35°–40° F.).

After the overnight aging, 37.9 g vanilla flavor was added to the homogenized mixture, with gentle stirring with a wooden spoon to prevent incorporation of air into the mixture. The mixture was then processed by freezing in an Armfield FT-25A continuous freezer.

Prior to being frozen, the viscosity of the homogenized flavored mixture was first determined for a 400 mL sample using a Brookfield RVT viscometer with spindle #3 at 20 rpm. A second viscosity measurement was made using a #3 Zahn cup. After freezing was complete, a frozen sample of the frozen dessert was characterized by calculating the overrun and measuring stiffness using a Brookfield RVT viscometer equipped with t-bar F and operated at 10 rpm for 15 seconds without a heliopath. The overrun in Example 2A and in all of the other examples in Example 2 was relatively consistent, being between 90–100%

The results of this procedure with Example 2A are summarized in Table 3 below, along with the results obtained for similar procedures carried out with all of the other frozen desserts (including Comparative Examples) prepared in this Example 2.

Each of the frozen dessert products prepared in this Example 2 (including Comparative Examples) was evaluated for its sensory characteristics by a panel of 5–8 persons. The textural properties evaluated by the panel included coldness, ice crystals, body, mouth coating, and gumminess. The evaluations were carried out for each of the frozen desserts at two different times: first, immediately after being frozen and hardened in a hardening box; and later, after having been kept in a frost-free freezer for three days (72 hours) during which there were 12 defrost cycles when the temperature of the freezer was temporarily raised to defrost it and then lowered to keep the freezer contents frozen. Panel ratings were based on a five point scale, ranging from 0, where there was no perception of the characteristic being rated, to 5, where the characteristic is strongly present. Note that high ratings for coldness, ice crystals and gumminess denote a frozen dessert product with negative textural properties but that high ratings for body and mouth coating are positive (favorable) product properties.

The results of this sensory evaluation of the frozen desserts of Example 2 are presented in Table 4 below. The data in Table 4 represent averages of the values assigned by all members of the sensory panel.

The sensory evaluation results at the lowest concentration of stabilizer employed, in Examples 2A and 2B and in Comparative Example C-2A in Table 4, show that the stabilizer composition of this invention was superior to the control in coldness, ice crystal, body and mouth coating ratings, both initially and after three days storage in a frost-free freezer. The control, however, had slightly better gumminess ratings both initially and after three days.

For the middle and highest levels of stabilizer employed in the frozen dessert of this Example, the differences in sensory ratings, as compared with the control, are not as large as was the case at the lowest stabilizer concentration used. At the middle concentration employed for the stabilizer with the preferred ratio of 85:15 MCC to alginate salt complex, shown as Example 2C in Table 4, the stabilizer provided better body and gumminess ratings both initially and after three days storage, as compared to Comparative Example C-2B; the stabilizer was also evaluated as better than the control in mouth coating after three days storage, even though initially they were rated equivalent. At the highest concentration of stabilizer with the 85:15 MCC to alginate salt complex, shown as Example 2E in Table 4, the stabilizer provided better coldness, ice crystal, body and mouth coating ratings both initially and after three days, as compared to Comparative Example C-2C; the control was evaluated as better than the stabilizer in gumminess initially, but both were rated equivalent after three days storage.

TABLE 2

| FORMULATION Ingredients | 2A, 2B, C-2A | 2C, 2D, C-2B | 2E, 2F, C-2C |
|---|---|---|---|
| | Amount (Weight %) | | |
| Whole milk | 37.07 | 37.07 | 37.07 |
| Light cream | 15.01 | 15.01 | 15.01 |
| Skim milk | 22.24 | 22.24 | 22.24 |
| Milk solids non fat | 6.77 | 6.67 | 6.57 |
| Sugar | 12.00 | 12.00 | 12.00 |
| Corn syrup solids | 5.22 | 5.22 | 5.22 |
| Water | 1.03 | 1.03 | 1.03 |
| Coprocessed MCC[a] | 0.30 | 0.40 | 0.60 |
| Carboxymethyl-cellulose | 0.1 | 0.1 | 0.1 |
| Carrageenan | 0.01 | 0.01 | 0.01 |
| Emulsifier | 0.25 | 0.25 | 0.25 |

[a]Coprocessed MCC and alginate for 2A, 2B, 2C, 2D, 2E, 2F; coprocessed MCC and CMC for C-2A, C-2B, C-2C

TABLE 3

| Example Number | Stabilizer Type | Viscosity (cps)[a] | (seconds)[b] | Temperature[c] (°C. (°F.)) | Stiffness (cps × 10$^6$) |
|---|---|---|---|---|---|
| 2A | (85:15)[d] | 292 | 21 | 2.8 (37) | 19 |
| 2B | (90:15) | 217 | 16 | 2.8 (37) | 19 |
| C-2A | Avicel® RC-581[e] | 150 | 13 | 2.8 (37) | 16 |
| 2C | (85:15) | 525 | 22 | 2.2 (36) | 21 |
| 2D | (90:10) | 250 | 16 | 2.2 (36) | 21 |
| C-2B | Avicel® RC-581 | 225 | 16 | 2.2 (36) | 20 |
| 2E | (85:15) | 825 | 31 | 2.8 (37) | 21 |
| 2F | (90:10) | 200 | 17 | 2.8 (37) | 19 |
| C-2C | Avicel® RC-581 | 175 | 15 | 2.8 (37) | 20 |

[a]Brookfield RVT viscometer, spindle #3.
[b]#3 Zahn cup.
[c]Temperature at which viscosity measurements were made.
[d](85:15) is the weight ratio of microcrystalline cellulose (85) to alginate (15) present in the coprocessed microcrystalline cellulose (MCC) component of the stabilizer composition
[e]Avicel® RC-581 contains coprocessed MCC and CMC in a ratio of 80:20

TABLE 4

| Example Number | Stabilizer Type | Sensory Evaluation Data | | | | | Evaluation Time |
|---|---|---|---|---|---|---|---|
| | | Coldness | Ice Crystals | Body | Mouth Coating | Gumminess | |
| 2A | (85:15)[a] | 2.3 | 1.7 | 1.9 | 1.7 | 1.0 | Initial |
| 2A | (85:15) | 2.3 | 1.8 | 1.8 | 1.8 | 1.1 | 3 Days |
| 2B | (90:10) | 2.3 | 1.6 | 1.9 | 1.9 | 1.0 | Initial |
| 2B | (90:10) | 2.0 | 1.5 | 1.9 | 1.9 | 1.1 | 3 Days |
| C-2A | Avicel® RC-581 | 2.9 | 2.2 | 1.7 | 1.4 | 0.8 | Initial |
| C-2A | Avicel® | 2.9 | 2.2 | 1.4 | 1.2 | 0.6 | 3 Days |

TABLE 4-continued

| Example Number | Stabilizer Type | Sensory Evaluation Data | | | | | Evaluation Time |
|---|---|---|---|---|---|---|---|
| | | Coldness | Ice Crystals | Body | Mouth Coating | Gumminess | |
| 2C | RC-581 (85:15) | 2.5 | 1.7 | 2.2 | 1.5 | 0.9 | Initial |
| 2C | (85:15) | 2.4 | 1.5 | 2.0 | 1.8 | 0.9 | 3 Days |
| 2D | (90:10) | 2.3 | 1.5 | 2.1 | 1.5 | 0.9 | Initial |
| 2D | (90:10) | 2.7 | 1.7 | 1.9 | 1.7 | 0.9 | 3 Days |
| C-2B | Avicel® RC-581 | 2.2 | 1.3 | 2.0 | 1.5 | 1.0 | Initial |
| C-2B | Avicel® RC-581 | 2.2 | 1.6 | 1.9 | 1.6 | 1.0 | 3 Days |
| 2E | (85:15) | 2.0 | 1.3 | 2.0 | 1.6 | 0.9 | Initial |
| 2E | (85:15) | 2.3 | 1.6 | 2.4 | 1.9 | 0.9 | 3 Days |
| 2F | (90:10) | 2.5 | 1.5 | 1.8 | 1.3 | 0.7 | Initial |
| 2F | (90:10) | 2.6 | 1.9 | 2.3 | 2.0 | 1.1 | 3 Days |
| C-2C | Avicel® RC-581 | 2.1 | 1.5 | 1.7 | 1.2 | 0.6 | Initial |
| C-2C | Avicel® RC-581 | 2.7 | 1.9 | 1.9 | 1.7 | 0.9 | 3 Days |

$^a$(85:15) is the ratio of microcrystalline cellulose (85) to alginate (15) present in the coprocessed MCC component of the stabilizer composition Example 3

Example 3 describes three frozen dessert formulations containing 3 weight % fat and the stabilizer compositions of this invention. All of the stabilizer compositions, as well as the frozen dessert formulations, were essentially free of carboxymethylcellulose and of any other cellulose ethers. The stabilizer compositions utilized several different hydrocolloid gums as the second component, in combination with the coprocessed MCC and alginate salt complex (85:15 weight ratio) that was the first component. The alginate salt complex in the coprocessed MCC material contained calcium and sodium in a respective weight ratio of 1.5:1. The hydrocolloid gum components in the three stabilizer compositions were guar gum and carrageenan (Example 3A), locust bean gum and carrageenan (Example 3B), and sodium alginate and carrageenan (Example 3C).

For comparative purposes, frozen dessert formulations were also included that contained the same hydrocolloid gums as in the inventive stabilizer compositions but that lacked the coprocessed MCC and alginate salt complex component of the inventive stabilizer compositions (Comparative Examples C-3A, C-3B, C-3C).

The frozen desserts were prepared by the following procedure, which is specific to Example 3A but which was generally followed for all of the other examples in this Example 3. Formulations for all the frozen desserts prepared in this Example 3 are summarized in Table 5 below, which also notes the differences in the stabilizer compositions for each of the examples (including the Comparative Examples). Note that the flavor component, which is introduced after the frozen dessert formulation is homogenized, is not included in the formulation data shown in Table 5.

All of the inventive stabilizer compositions were used at a use level of about 0.52–0.57 weight %, based on the weight of the frozen dessert. Adjustments were made to increase the amount of the hydrocolloid gums in the Comparative Examples to compensate for the absence of functionality provided by the coprocessed MCC component in the inventive stabilizer compositions.

In a container stirred with a Lightnin® mixer was placed 5400.4 g water. A dry blend was prepared containing 960 g milk solids non fat, 960 g sugar, 276 g corn syrup solids, and the stabilizer composition: 32 g 85% microcrystalline cellulose coprocessed with 15% calcium/sodium alginate salt complex, 12 g Procol® U guar gum (Polypro International, Minneapolis, Minn.) and 1.6 g Danagel® IC 15 carrageenan (FMC Corporation, Philadelphia, Pa.). This dry blend was then added to the vortex of the stirred water in the container, and the resulting mixture was stirred for 30 minutes to fully hydrate the hydrocolloid gums in the dry blend. (In Example 3B, the hydrocolloid gum used in lieu of the guar gum of Example 3A was 99-FL 50—50 locust bean gum (Hercules Incorporated, Wilmington, Del.), and in Example 3C, the hydrocolloid gum was Kelgin® HV sodium alginate (Kelco Division of Monsanto Company, St Louis, Mo.), used with a calcium sequestrant, tetrasodium pyrophosphate.)

Concurrently with the above-noted steps, 296 g unsalted butter containing 81% fat was melted in a microwave oven. To the butter was added 32 g Palsgaard® 5900 mono-, diglyceride emulsifier sold by (Palsgaard Industri A/S, Denmark) and 54 g water. The mixture was completely melted after 30 seconds heating in the microwave oven.

The completely molten mixture of emulsified butterfat was then added to the stirred mixture of the other ingredients. After the combined mixture was uniformly mixed, it was pasteurized by HTST in a Cherry-Burrel Ultra High Temperature unit operated for two minutes at 76.7° C. (170° F.). After pasteurization, the mixture was homogenized using an APV Gaulin Homogenizer, the first stage being operated at 2000 psi and the second stage at 500 psi. Upon completion of homogenization, the homogenized mixture was cooled and aged overnight in a refrigerator at 1.7°–4.4° C. (35°–40° F.).

After the overnight aging, 36 g vanilla flavor was added to the homogenized mixture, with gentle stirring with a wooden spoon to prevent incorporation of air into the mixture. The mixture was then processed by freezing in an Armfield FT-25 A continuous freezer. Prior to being frozen, the viscosity of the homogenized flavored mixture was determined for a 400 mL sample using a Brookfield RVT viscometer equipped with spindle #3 at 20 rpm. A second viscosity measurement was made using a #3 Zahn cup. After freezing was complete, a frozen sample of the frozen dessert was characterized by calculating the overrun and measuring stiffness using a Brookfield RVT viscometer equipped with t-bar F and operated at 10 rpm for 15 seconds without a heliopath. The results of this procedure with Example 3A are summarized in Table 6 below, along with the results of similar procedures carried out with each of the other frozen desserts (including Comparative Examples) prepared in this Example 3.

Each of the frozen dessert products prepared in this Example 3 (including Comparative Examples) was evaluated for its sensory characteristics by a panel of 5–8 persons. The textural properties evaluated by the panel included coldness, ice crystals, body, mouth coating, and gumminess. The results of these evaluations of the frozen desserts prepared in this Example 3 are summarized in Table 7 below.

As is noted in Table 7, the evaluations were carried out for each of the frozen desserts at three different times: first, immediately after being frozen and hardened in a hardening box; and subsequently, five days and eight days after having been stored in a frost-free freezer (for Example 3A and 3B and for Comparative Examples C-3A and C-3B) or three days and seventeen days after having been stored in a frost-free freezer (for Example 3C and for Comparative Examples C-3C). The frost-free freezer was subjected to 4 defrost cycles per day, during which the temperature of the freezer was temporarily raised to defrost it and then lowered to keep the freezer contents frozen. Panel ratings shown in the Table were based on a five point scale, ranging from 0, where there was no perception of the characteristic being rated, to 5, where the characteristic is strongly present. The data in Table 7 represent averages of the values assigned by all members of the sensory panel.

The sensory evaluation results for all of the inventive stabilizer compositions evaluated in Example 3 show that the initial performance ratings of these carboxymethylcellulose-free frozen desserts were generally equivalent to the controls.

The sensory evaluation results for the guar-based stabilizer composition in Example 3A, compared with Comparative Example C-3A, show that the stabilizer composition of this invention was generally superior in coldness and ice crystal ratings after multiple day storage in a frost-free freezer, demonstrating the effectiveness of the CMC-free formulation in retarding growth of ice crystals.

The sensory evaluation results for the locust bean gum-based stabilizer composition of Example 3B, shown in Table 7, indicate relatively small differences between this stabilizer and the control, Comparative Example C-3B. This suggests that the stabilizer composition may benefit from the presence of additional hydrocolloid gums, in addition to the locust bean gum and carrageenan, to provide complementary properties not present in the combination of hydrocolloids evaluated.

The sensory evaluation results for the sodium alginate-based stabilizer composition of Example 3C, shown in Table 7, indicate relatively small differences between this stabilizer and the control, Comparative Example C-3C. The stabilizer composition of this invention provided better ice crystal, body and mouth coating ratings after 17 days frost free freezer storage, as compared with the control, Comparative Example C-3C.

TABLE 5

| FORMULATION Ingredients | C-3A | 3A | C-3B | 3B | C-3C | 3C |
|---|---|---|---|---|---|---|
| | Amount (Weight %) | | | | | |
| Unsalted Butter[a] | 3.7 | 3.7 | 3.7 | 3.7 | 3.7 | 3.7 |
| Milk Solids Non Fat | 12 | 12 | 12 | 12 | 12 | 12 |
| Water | 68.18 | 68.18 | 68.18 | 68.18 | 68.18 | 68.18 |
| Sugar | 12 | 12 | 12 | 12 | 12 | 12 |
| Corn Syrup Solids | 3.45 | 3.15 | 3.5 | 3.2 | 3.35 | 3.15 |
| Emulsifier | 0.4 | 0.4 | 0.4 | 0.4 | 0.4 | 0.4 |
| Coprocessed MCC: alginate[b] | | 0.4 | | 0.4 | | 0.4 |
| Carrageenan | 0.02 | 0.02 | 0.02 | 0.02 | 0.02 | 0.02 |
| Guar gum | 0.25 | 0.15 | | | | |
| Locust bean gum | | | 0.2 | 0.1 | | |
| Sodium alginate | | | | | 0.3 | 0.1 |
| Tetrasodium pyrophosphate | | | | | 0.05 | 0.05 |

[a]Unsalted buffer having a fat content of 81%, providing 3 weight % fat in the formulation.
[b]85:15 weight ratio of microcrystalline cellulose (85) to alginate (15) present in the coprocessed MCC material.

TABLE 6

| Example Number | Viscosity | | Overrun[c] | Stiffness & Temperature[d] | |
|---|---|---|---|---|---|
| | (cps)[a] | (seconds)[b] | (%) | (cps × 10⁶) | (°C.(°F.)) |
| C-3A | 325 | 16.5 | 75–125 | 21 | −5 (23) |
| 3A | 675 | 26.5 | 90–100 | 20 | −4.5 (23.9) |
| C-3B | 250 | 7.75 | 90–110 | 24 | −5.2 (22.6) |
| 3B | 225 | 9 | 85–105 | 25 | −5.3 (22.5) |
| C-3C | 340 | 12e | 90–100 | 26 | −4.9 (23.2) |
| 3C | 540 | 13e | 90–100 | 25 | −4.9 (23.2) |

[a]Brookfield RVT viscometer, #3 spindle
[b]#3 Zahn cup.
[c]Overrun is a measure of the amount of air deliberately introduced into the frozen dessert during freezing.
[d]Temperature at which stiffness measurements were made.
[e]Temperature of the mixture was 5.6° C. (42° F.) when the viscosity measurement was made, as compared with a temperature of 4.4° C. (40° F.) when the viscosity measurement was made for the previous Examples.

TABLE 7

| Example Number | Sensory Evaluation Data | | | | | Evaluation Time |
|---|---|---|---|---|---|---|
| | Coldness | Ice Crystals | Body | Mouth Coating | Gumminess | |
| C-3A | 2.8 | 0.9 | 1.9 | 1.7 | 0.9 | Initial |
| C-3A | 3.6 | 2.5 | 1.9 | 1.9 | 1.1 | 5 Days |
| C-3A | 2.3 | 1.7 | 1.9 | 1.7 | 0.8 | 8 Days |
| 3A | 2.9 | 0.9 | 1.9 | 1.7 | 0.9 | Initial |
| 3A | 3.1 | 2.1 | 1.9 | 1.9 | 1.1 | 5 Days |
| 3A | 2.7 | 1.3 | 2.1 | 1.9 | 0.9 | 8 Days |
| C-3B | 2.8 | 1.2 | 1.9 | 1.3 | 0.7 | Initial |
| C-3B | 3.4 | 1.8 | 0.8 | 0.9 | 0.5 | 5 Days |

TABLE 7-continued

| Example Number | Sensory Evaluation Data | | | | | Evaluation Time |
|---|---|---|---|---|---|---|
| | Coldness | Ice Crystals | Body | Mouth Coating | Gumminess | |
| C-3B | 2.2 | 1.5 | 1.6 | 1.8 | 0.8 | 8 Days |
| 3B | 3.1 | 1.2 | 1.9 | 1.3 | 0.7 | Initial |
| 3B | 3.8 | 1.9 | 0.6 | 0.8 | 0.7 | 5 Days |
| 3B | 2.8 | 1.7 | 1.7 | 1.5 | 1.2 | 8 Days |
| C-3C | 3.2 | 1.2 | 1.4 | 1.2 | 1.1 | Initial |
| C-3C | 3.7 | 1.3 | 1.4 | 1.3 | 0.3 | 3 Days |
| C-3C | 4.2 | 2.4 | 0.9 | 1.1 | 0.4 | 17 Days |
| 3C | 3.3 | 1.3 | 1.4 | 0.9 | 0.7 | Initial |
| 3C | 3.9 | 1.4 | 1.3 | 1.2 | 0.3 | 3 Days |
| 3C | 4.1 | 2.1 | 1.3 | 1.2 | 0.7 | 17 Days |

What is claimed is:

1. A stabilizer composition, useful for stabilizing frozen desserts, comprising (a) a first component of microcrystalline cellulose (MCC) coprocessed with a calcium/sodium alginate salt complex and containing sufficient MCC such that the weight ratio of MCC to alginate salt complex is greater than about 80:20, in combination with (b) a second component of at least one water soluble hydrocolloid selected from the group consisting of guar gum, locust bean gum, sodium alginate, carrageenan, gum tragacanth, karaya gum, gum arabic, agar, konjac, xanthan gum, carboxymethylcellulose, methylcellulose, hydroxymethylcellulose and hydroxypropylmethylcellulose.

2. The stabilizer composition of claim 1 wherein, in the first component, sufficient microcrystalline cellulose is present such that the weight ratio of MCC to calcium/sodium alginate salt complex is greater than about 80:20 up to about 90:10 MCC to alginate salt complex.

3. The stabilizer composition of claim 1 wherein the weight ratio of the first component to the second component is from about 1:1 to about 19:1.

4. The stabilizer composition of claim 1 wherein the second component is at least one water soluble hydrocolloid selected from the group consisting of guar gum, locust bean gum, sodium alginate, carrageenan, xanthan gum and carboxymethylcellulose.

5. The stabilizer composition of claim 1 wherein, in the first component, the ratio of MCC to alginate salt complex is about 85:15 and, in the second component, carboxymethylcellulose is present.

6. The stabilizer composition of claim 1 wherein the stabilizer composition is essentially free of carboxymethylcellulose.

7. The stabilizer composition of claim 1 wherein only one water soluble hydrocolloid is present as the second component of the stabilizer composition.

8. The stabilizer composition of claim 1 wherein the second component is sodium alginate and which further comprises a calcium sequestrant.

9. The stabilizer composition of claim 1 which further comprises at least one adjuvant selected from the group consisting of emulsifier, standardization agent, sweetener, coloring agent, flavoring and sequestrant.

10. A frozen dessert product comprising a frozen dessert having less than about 12 weight % fat and containing a stabilizer system that has (a) a first component of microcrystalline cellulose (MCC) coprocessed with a calcium/sodium alginate salt complex, containing sufficient MCC such that the weight ratio of MCC to alginate salt complex is greater than about 80:20, in combination with (b) a second component of at least one water soluble hydrocolloid selected from the group consisting of guar gum, locust bean gum, sodium alginate, carrageenan, gum tragacanth, karaya gum, gum arabic, agar, konjac, xanthan gum, carboxymethylcellulose, methylcellulose, hydroxymethylcellulose and hydroxypropylmethylcellulose.

11. The frozen dessert product of claim 10 wherein the stabilizer system is present in the frozen dessert in an amount of from about 0.1 weight % to about 1 weight %.

12. The frozen dessert product of claim 10 wherein the first component of the stabilizer system is present in the frozen dessert in an amount of from about 0.05 weight % to about 0.8 weight %.

13. The frozen dessert product of claim 10 wherein, in the first component of the stabilizer system, sufficient microcrystalline cellulose is present such that the weight ratio of MCC to calcium/sodium alginate salt complex is greater than about 80:20 up to about 90:10 MCC to alginate salt complex.

14. The frozen dessert product of claim 10 wherein, in the stabilizer system, the weight ratio of the first component to the second component is from about 1:1 to about 19:1.

15. The frozen dessert product of claim 10 wherein the second component is present in the frozen dessert in an amount of from about 0.05 weight % to about 0.8 weight %.

16. The frozen dessert product of claim 10 wherein, in the stabilizer system, the second component is at least one water soluble hydrocolloid selected from the group consisting of guar gum, locust bean gum, sodium alginate, carrageenan, xanthan gum and carboxymethylcellulose.

17. The frozen dessert product of claim 10 wherein, in the first component of the stabilizer system, the ratio of MCC to alginate salt complex is about 85:15 and, in the second component, carboxymethylcellulose is present.

18. The frozen dessert product of claim 10 wherein the stabilizer composition is essentially free of carboxymethylcellulose.

19. The frozen dessert product of claim 10 wherein only one water soluble hydrocolloid is present as the second component of the stabilizer system.

20. The frozen dessert product of claim 10 wherein the frozen dessert contains a fat source selected from the group consisting of butterfat, milkfat, vegetable fat and vegetable oil.

21. The frozen dessert product of claim 10 wherein the frozen dessert contains less than about 5 weight % fat.

22. The frozen dessert product of claim 10 wherein the frozen dessert contains essentially no fat.

23. The frozen dessert product of claim 10 wherein the frozen dessert is selected from the group consisting of ice cream, ice milk, soft serve ice cream, frozen yogurt, frozen milk shake, sherbet, gelato and mellorine.

24. A method of providing heat shock resistance in a frozen dessert product which comprises incorporating into a frozen dessert a stabilizer system that has (a) a first component of microcrystalline cellulose (MCC) coprocessed with a calcium/sodium alginate salt complex, containing sufficient MCC such that the weight ratio of MCC to alginate salt complex is greater than about 80:20, in combination with (b) a second component of at least one water soluble hydrocolloid selected from the group consisting of guar gum, locust bean gum, sodium alginate, carrageenan, gum tragacanth, karaya gum, gum arabic, agar, konjac, xanthan gum, carboxymethylcellulose, methylcellulose, hydroxymethylcellulose and hydroxypropylmethylcellulose;

said stabilizer system being incorporated into the frozen dessert in an amount of from about 0.1 weight % to about 1 weight %; and said frozen dessert having less than about 12 weight % fat.

25. The method of claim 24 wherein the stabilizer system is incorporated into the frozen dessert in an amount of from about 0.2 weight % to about 0.6 weight %.

26. The method of claim 24 wherein the first component of the stabilizer system is present in the frozen dessert in an amount of from about 0.05 weight % to about 0.8 weight %.

27. The method of claim 24 wherein, in the first component, sufficient microcrystalline cellulose is present such that the weight ratio of MCC to calcium/sodium alginate salt complex is greater than about 80:20 up to about 90:10 MCC to alginate salt complex.

28. The method of claim 24 wherein, in the stabilizer system, the weight ratio of the first component to the second component is from about 1:1 to about 19:1.

29. The method of claim 24 wherein the second component is present in the frozen dessert in an amount of from about 0.05 weight % to about 0.8 weight %.

30. The method of claim 24 wherein, in the stabilizer system, the second component is at least one water soluble hydrocolloid selected from the group consisting of guar gum, locust bean gum, sodium alginate, carrageenan, xanthan gum and carboxymethylcellulose.

31. The method of claim 24 wherein, in the first component of the stabilizer system, the ratio of MCC to alginate salt complex is about 85:15 and, in the second component, carboxymethylcellulose is present.

32. The method of claim 24 wherein the stabilizer composition is essentially free of carboxymethylcellulose.

33. The method of claim 24 wherein only one water soluble hydrocolloid is present as the second component of the stabilizer system.

34. The method of claim 24 wherein the frozen dessert contains a fat source selected from the group consisting of butterfat, milkfat, vegetable fat and vegetable oil.

35. The method of claim 24 wherein the frozen dessert contains less than about 5 weight % fat.

36. The method of claim 24 wherein the frozen dessert contains essentially no fat.

37. The method of claim 24 wherein the frozen dessert is selected from the group consisting of ice cream, ice milk, soft serve ice cream, frozen yogurt, frozen milk shake, sherbet, gelato and mellorine.

* * * * *